No. 665,575. Patented Jan. 8, 1901.
J. MUGGENBURG.
VULCANIZER.
(Application filed Mar. 31, 1900.)
(No Model.)
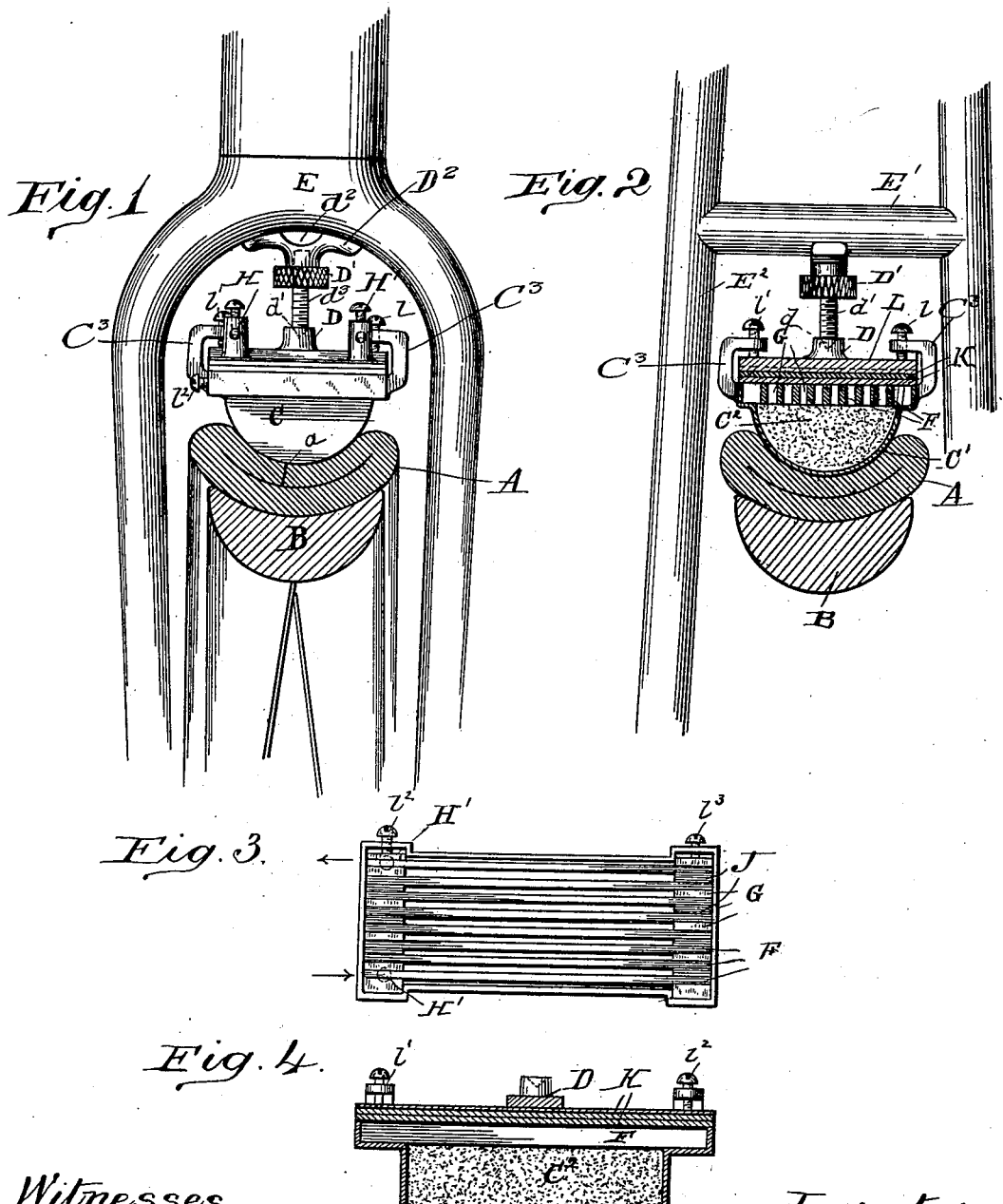

UNITED STATES PATENT OFFICE.

JULIUS MUGGENBURG, OF CHICAGO, ILLINOIS.

VULCANIZER.

SPECIFICATION forming part of Letters Patent No. 665,575, dated January 8, 1901.

Application filed March 31, 1900. Serial No. 11,034. (No model.)

*To all whom it may concern:*

Be it known that I, JULIUS MUGGENBURG, of Chicago, in the county of Cook and State of Illinois, have invented certain new and useful Improvements in Vulcanizers, of which the following is a full and clear description, reference being had to the accompanying drawings, in which—

Figure 1 is an end elevation showing my device attached to the front tire of a bicycle. Fig. 2 is a cross-section showing the same device attached to the tire of the rear wheel. Fig. 3 is a plan view of the vulcanizer with the top plate removed. Fig. 4 is a longitudinal section of the same including said top plate.

The main object of my invention is to provide an improved portable vulcanizer which can be readily used for vulcanizing a punctured tire without removing said tire from the wheel.

The device shown in the drawings consists mainly of a casing C, having a convex under surface C', with an electrical heater in said casing and a suitable jack mounted upon the casing, designed to bear against a fixed part of the bicycle-frame, and thus depress the convex part upon a deflated mounted tire.

B represents the wheel-rim.

In Fig. 1 the tire A is shown as punctured at $a$.

The casing C has a reservoir $C^2$, which is preferably filled with fire-clay or similar material. Above said clay are a series of carbon-bars F, which serve as a resistance to the electric current in generating heat. The ends of said carbon-bars are alternately separated by short insulating-bars G, of glass or other suitable material, and alternately connected by short carbon-bars J. Thus the current will pass through said carbon-bars from the contact H to the contact H'. Said contacts are insulated from the casing by means of the asbestos lining or other suitable material. The carbon-bars are likewise insulated from said casing. Arms $C^3$ are rigid on the body of the casing and extend over the plate or cover L. The set-screws $l$ and $l'$ are seated in the arms $C^3$ and bear upon the plate L. Insulating-sheets K, of asbestos or similar material, are seated between the plate L and the carbon-bars F. The set-screws $l^2$ and $l^3$ bear against glass insulating-bars G and are designed to securely hold said insulating-bars and the carbon-bars in a fixed position in the casing. The plate L is provided with a bearing-piece D, forming a seat for the end $d'$ of the jack-screw $d^3$. The upper end of the jack-screw is vertically slidable in its bearing-head $D^2$. The milled nut D' is threaded upon the jack-screw and works against the head $D^2$. The head $D^2$ has a concave upper surface for fitting the groove E of the front fork. Said bearing-head has also the opposite groove or convex surface $d^2$ for fitting the strut E' of the rear fork $E^2$.

It will be understood that the details of construction of my device may be altered in numerous ways without departing from the spirit of my invention. I therefore do not confine myself to such details except as hereinafter limited in the claims.

What I claim as my invention, and desire to secure by Letters Patent, is—

1. A vulcanizer for pneumatic tires, comprising a casing having a convex under surface, a heater in said casing, and a jack adapted to bear against the fork of a bicycle-frame above a mounted tire and thereby urge said convex surface upon the tire, substantially as described.

2. A vulcanizer for pneumatic tires comprising a casing having a convex under surface and a removable cover, an electrical-thermocircuit maker in said casing, and insulated therefrom, electrical contacts communicating with said circuit-maker from the outside of the casing and insulated from the casing, and a jack mounted on said cover and adapted to bear against the fork of a bicycle-frame above a mounted tire and thereby urge said convex surface upon the tire, said thermocircuit-maker being located between the jack and said convex surface, substantially as described.

JULIUS MUGGENBURG.

Witnesses:
F. A. RYTHER,
J. A. PLOPPER.